US010577069B1

(12) United States Patent
Lonsberry et al.

(10) Patent No.: US 10,577,069 B1
(45) Date of Patent: Mar. 3, 2020

(54) MULTI-COMPONENT GEAR UNIT

(71) Applicant: Zeteos Corporation, Berwyn, IL (US)

(72) Inventors: Andrew G. Lonsberry, Hudson, OH (US); Alexander J. Lonsberry, Cleveland Heights, OH (US)

(73) Assignee: ZETEOS CORPORATION, Berwyn, IL (US)

( * ) Notice: Subject to any disclaimer, the term of this patent is extended or adjusted under 35 U.S.C. 154(b) by 196 days.

(21) Appl. No.: 15/621,608

(22) Filed: Jun. 13, 2017

Related U.S. Application Data

(60) Provisional application No. 62/349,961, filed on Jun. 14, 2016.

(51) Int. Cl.
*B63H 23/02* (2006.01)
*F16H 1/20* (2006.01)

(52) U.S. Cl.
CPC ............. *B63H 23/02* (2013.01); *F16H 1/20* (2013.01)

(58) Field of Classification Search
CPC ........ B63H 23/02; B63H 23/08; B63H 23/32; F16H 55/088; F16H 55/0886; F16H 55/12; F16H 55/14; F16H 55/16; F16H 2055/176
USPC ......... 74/413, 414, 423, 438, 439, 447, 457, 74/459.5; 440/74
See application file for complete search history.

(56) References Cited

U.S. PATENT DOCUMENTS

| | | | |
|---|---|---|---|
| 670,386 A * | 3/1901 | Howland-Sherman | F16H 55/12 74/448 |
| 792,656 A | 6/1905 | Heberling | |
| 1,412,706 A * | 4/1922 | Pearce | F16H 55/12 74/459.5 |
| 1,520,625 A * | 12/1924 | Wigley | F16H 55/12 29/893 |
| 2,307,129 A * | 1/1943 | Hines | F16D 3/76 464/89 |
| 2,862,400 A * | 12/1958 | Angelo | F16H 55/17 104/29 |
| 3,472,092 A * | 10/1969 | Pedigo | B23F 23/06 29/893.35 |
| 3,733,921 A * | 5/1973 | Carveth | F16H 55/06 29/893.37 |
| 3,926,065 A * | 12/1975 | Summers | F16H 48/06 74/417 |
| 4,031,769 A * | 6/1977 | Kassing | F16H 55/12 474/162 |
| 4,244,454 A | 1/1981 | Bankstahl et al. | |
| 4,257,506 A | 3/1981 | Bankstahl et al. | |
| 4,416,650 A * | 11/1983 | Wilkins | B65G 39/02 198/789 |
| 5,596,905 A * | 1/1997 | Kurosawa | F16H 55/14 74/443 |
| 5,870,928 A * | 2/1999 | Genter | F16H 55/18 74/409 |
| 5,956,998 A * | 9/1999 | Fenelon | E05B 81/25 292/144 |
| 6,324,931 B1 | 12/2001 | Tsung | |
| 6,547,613 B1 * | 4/2003 | Onoue | B63H 23/34 440/75 |

(Continued)

*Primary Examiner* — Jake Cook
*Assistant Examiner* — T. Scott Fix
(74) *Attorney, Agent, or Firm* — Honigman LLP

(57) ABSTRACT

A gear unit including a gear, a hub, and a support ring configured to reduce the maximum stress on the gear teeth and, in particular, the toe of the gear teeth.

18 Claims, 14 Drawing Sheets

(56) References Cited

U.S. PATENT DOCUMENTS

| | | | |
|---|---|---|---|
| 6,834,751 B1 | 12/2004 | Magee | |
| 6,960,107 B1 | 11/2005 | Schaub et al. | |
| 7,383,750 B2 * | 6/2008 | Menjak | B23P 15/14 |
| | | | 74/409 |
| 7,793,753 B2 * | 9/2010 | Bernhard | F16H 55/12 |
| | | | 180/444 |
| 7,827,692 B2 | 11/2010 | Geiman | |
| 7,827,879 B2 * | 11/2010 | Hoshino | B21K 1/30 |
| | | | 74/420 |
| 8,435,090 B1 | 5/2013 | Lonnborg et al. | |
| 8,517,884 B2 | 8/2013 | Geiman et al. | |
| 8,695,449 B2 * | 4/2014 | Lang | F16H 55/14 |
| | | | 74/409 |
| 8,858,384 B2 * | 10/2014 | Fusegi | F16H 48/24 |
| | | | 192/108 |
| 9,222,569 B2 * | 12/2015 | Mittermair | F16H 55/06 |
| 2002/0002092 A1 * | 1/2002 | Reguzzi | F16H 55/12 |
| | | | 474/152 |
| 2005/0028629 A1 * | 2/2005 | Acosta | F16H 55/14 |
| | | | 74/440 |
| 2007/0221005 A1 | 9/2007 | Geiman | |
| 2008/0022798 A1 * | 1/2008 | Zeise | B23H 3/00 |
| | | | 74/424.5 |
| 2018/0216671 A1 * | 8/2018 | Reichert | F16D 11/14 |

* cited by examiner

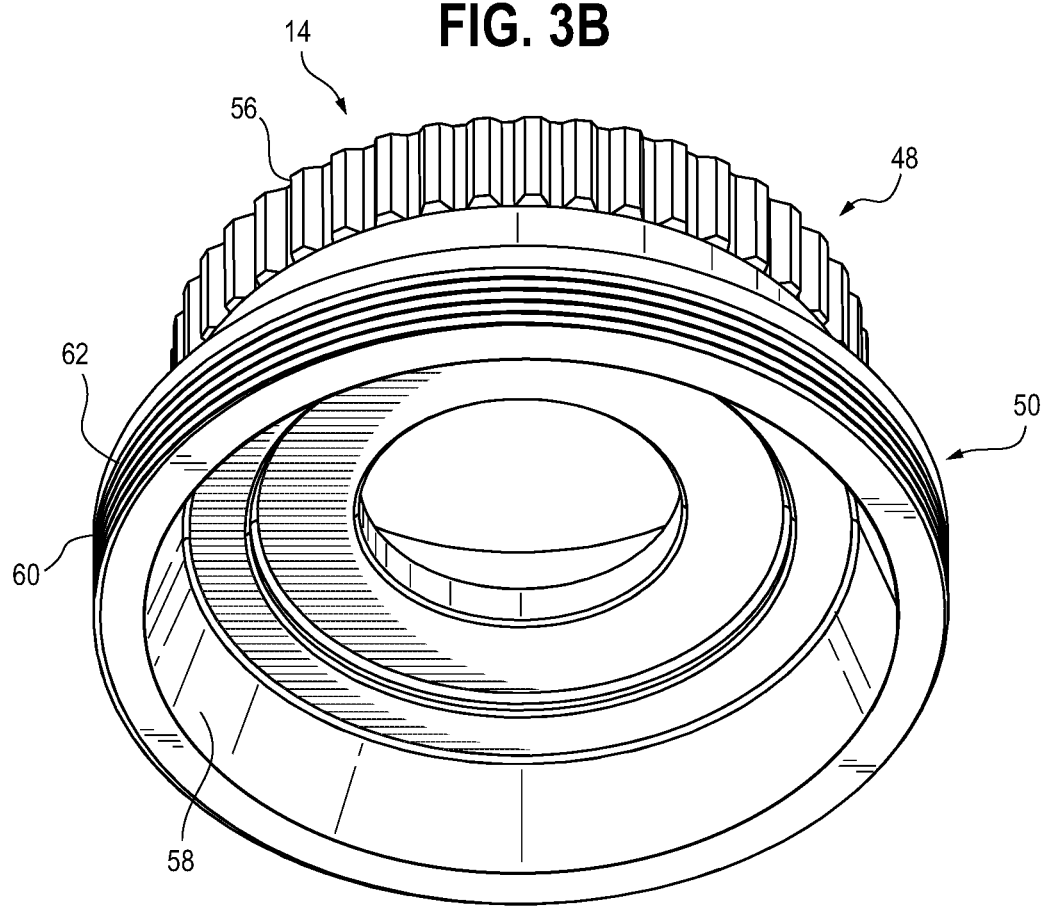

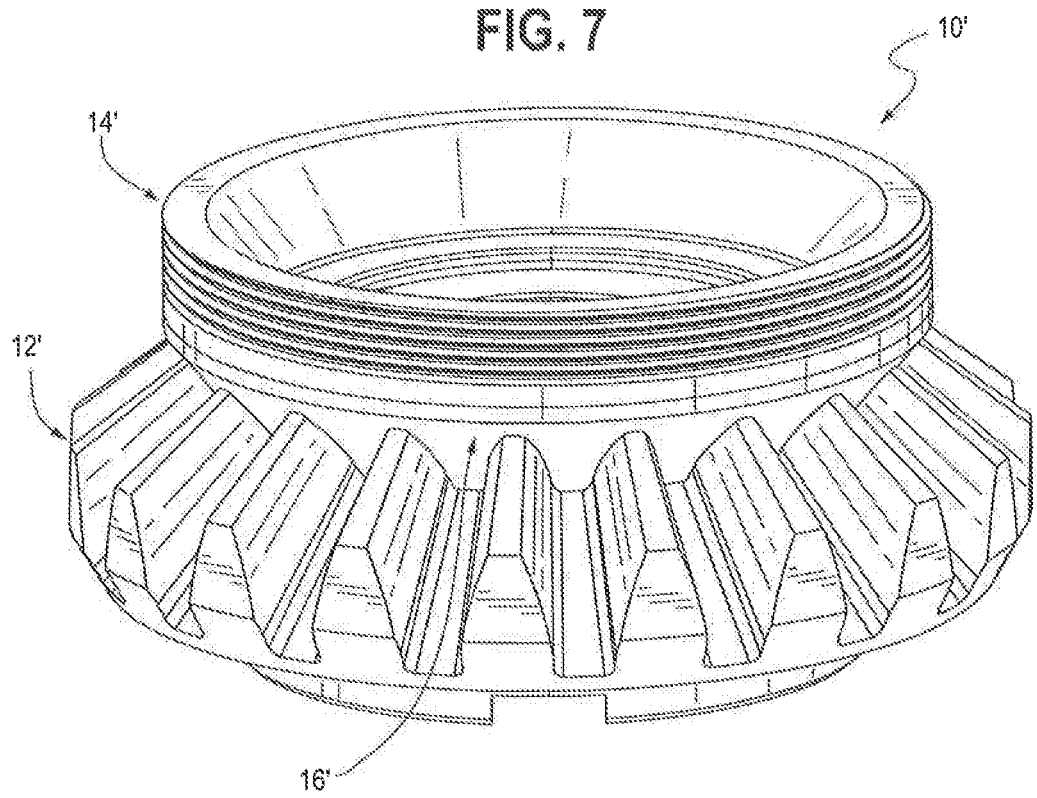

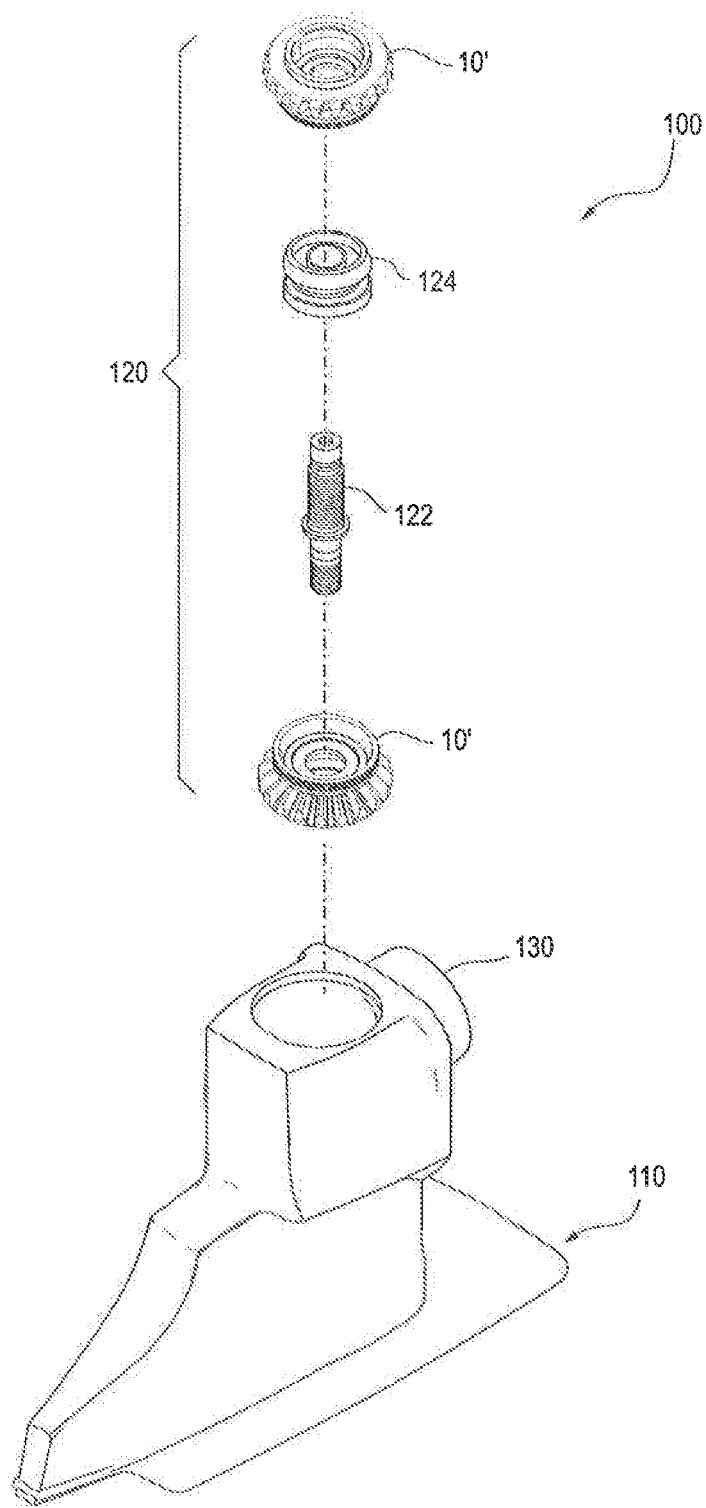

MULTI-COMPONENT GEAR UNIT

CROSS-REFERENCE TO RELATED APPLICATION

This application is a non-provisional application claiming the benefit of priority to U.S. Provisional Application Ser. No. 62/349,961, entitled "Gear Comprised of 3 Parts," filed Jun. 14, 2016, which is incorporated herein by reference in its entirety.

FIELD

The present disclosure relates generally to a gear unit for a powertrain, and more specifically, to a multi-component gear unit having a bevel gear for use in a cone-clutch gear assembly.

BACKGROUND

This section provides background information related to the present disclosure and is not necessarily prior art.

Many recreational and marine work force boats utilize stern drive propulsion systems to generate locomotion. Specifically, many boats use cone-clutch drives, which implement an opposing pair of straight-cut bevel gears to translate forward rotation of an input shaft from an engine into both forward and reverse rotation of an output shaft, which may be connected to a propeller.

In operation, the speed of the engine and the drive must be modulated in different surface conditions, as the water produces resistance to the drive through the propeller(s). Calm surface conditions create somewhat stable resistance forces. However, choppy or larger wave conditions create intermittent resistance forces, especially as boat speed increases.

Proper operation of a boat involves utilizing the throttle to increase power and speed while the drive is submerged, and reducing the throttle input if the drive is out of the water. For example, as a speed of the boat increases and the boat achieves plane, the propeller(s) can leave the water, which significantly reduces the resistance to the drive and causes the engine to "over-rev." The operator must then reduce throttle input and engine/propeller speed to more closely match the actual boat speed prior to the propeller(s) returning and reengaging with the water. In instances where the speed of the propeller(s) does not match the actual speed of the boat prior to reengaging the water, the load applied to the propeller creates a form of shock, which is ultimately transmitted from the propeller through the various components of the drive. This is a regular occurrence, and the modulation technique is preferably implemented regardless of engine horsepower, torque or drive specification limits.

In addition to stresses imposed by intermittent engagement of the propeller with the water, stresses imposed on marine drive components may be magnified by increased engine performance. Marine stern drive units provided by Original Equipment Manufacturers (OEM) are generally designed according to the horsepower and torque outputs of an associated OEM engine. However, as boat engines are tuned and modified by third parties to maximize performance, the stresses imposed on the components of the drive may exceed the original design parameters. Accordingly, the aforementioned stresses introduced by intermittent engagement of the propeller with the water are compounded by increased power output of the engine.

Although many components of marine drives have been provided with design improvements, cone-clutch gear sets have yet to be addressed, and are a common weak link of marine drives. Generally, the weakness in cone-clutch drives is in one specific area, the roots at the toe of the teeth in the straight-cut bevel gear. Given the taper of teeth in straight-cut bevel gears, the toe of the gear tooth has a smaller cross-sectional area and exterior surface area, which, in part, leads to higher stress concentrations relative to the other portions of the tooth. Higher stress at the toe of the tooth is also due in part from higher loads applied to the toe of the tooth due to the distribution of a constant torque.

Manufacturability is a constraint on the development of cone-clutch gear sets. OEM marine drive gear and pinion sets are typically manufactured using near net forging. Although near net forging is a cost effective way of gear production and results in relatively high-strength grain structures, it is not without drawbacks. For example, near net forging results in relatively rough surface finishes with poor tolerances, which in turn reduces rolling contact surfaces and increases friction between meshing gear faces. Further, near net forging may result in surface blemishes, which act as stress risers when the teeth are subjected to a load. The additional tangential force and stress risers can cause microfractures along the surface of the tooth which leads to pitting fatigue on the contact surface.

Due to the manufacturing constraints of near net forging processes, the toes of the bevel gear teeth are independently formed from each other, and must individually accommodate imposed stresses. As a result, the unsupported teeth generally exhibit evidence of fatigue at the root, as the toes of each of the individual teeth are repeatedly subjected to stresses beyond their design specifications.

SUMMARY

This section provides a general summary of the disclosure, and is not a comprehensive disclosure of its full scope or all of its features. In one aspect, a gear unit is described. In some approaches, the gear unit includes a gear with an annular body having an aperture formed therethrough and with a plurality of gear teeth extending from the annular body; a hub formed separately from the gear and having at least a portion of the hub received within the aperture and wherein the hub is rotationally fixed with respect to the gear; and a ring encircling the hub and defining a support surface, the support surface engaging one or more of the plurality of gear teeth to provide support thereof. In some approaches, each of the gear, the hub, and the ring are separable from each other.

In alternative approaches, the gear of the preceding paragraph may be combined individually or in combination with various further aspects, these aspect include wherein the support surface of the ring is at least partially defined by a plurality of ring teeth spaced and sized so that at least a first one of the ring teeth is received adjacent at least a portion of a first one of the gear teeth and a second one of the ring teeth is received adjacent at least a portion of a second one of the gear teeth; wherein the separate retaining ring includes a tapered inner surface; wherein the support surface intersects the inner surface of the retaining ring; wherein the hub includes a tapered neck configured to be received on the inner surface of the ring; wherein the inner surface of the ring cooperates with a toe of at least one of the gear teeth to form a continuous inner surface; wherein the annular body of the gear includes internal splines disposed within the aperture and the hub includes corresponding external mating splines; wherein each of the plurality of the gear teeth includes a toe formed at a radially inwardly end thereof, and the support surface of the retaining ring engages of the plurality of the gear teeth adjacent the toe thereof to provide support of each of the plurality of the gear teeth; wherein the support surface of the retaining ring includes spaced recesses and a ring tooth formed between adjacent ones of the spaced recesses, the spaced recesses corresponding to the at least one or more gear teeth and sized so that at least a first one of the recesses receives at least a portion of a first one of the gear teeth and a second one of the recesses receives at least a portion of a second one of the gear teeth, and the ring tooth is positioned between the gear teeth to provide support between a toe of the first one of the gear teeth and a toe of the second one of the gear teeth; and/or wherein the base gear is one of a straight-cut bevel gear, a spiral bevel gear, a combination straight-cut and spiral bevel gear, or other bevel gear.

In another aspect, a gear unit is also provided that includes an annular gear formed about an axis having a plurality of gear teeth extending from an end of the gear at an oblique first angle with respect to the axis; an annular ring formed about the axis, a plurality of ring teeth extending from an end of the ring at an oblique second angle with respect to the axis, wherein each of the plurality of the ring teeth are meshed with each of the plurality of the gear teeth; and the annular ring is rotationally fixed or secured with respect to the annular gear such that these two components rotate as a single piece in use.

In alternative approaches, the gear of the preceding paragraph may be combined individually or in combination with various further aspects, these aspect include further comprising a hub having a cylindrical housing formed about the axis, a first end portion of the housing received within the gear, a second end portion of the hub extending axially away from the gear and the ring, and an intermediate portion at least partially received by each of the gear and the ring; wherein gear includes an aperture formed therethrough, the aperture including a first engaging feature configured to cooperate with the first end portion of the hub to minimize relative rotation between the gear and the hub; wherein the second end portion of the hub includes a conical surface; wherein the intermediate portion of the hub includes a frustoconical outer sidewall, the outer sidewall of the intermediate portion configured to be received within each of the gear and the ring; wherein the gear, the ring, and the hub are separately formed from each other; wherein at least two of the gear, the ring, and the hub are formed as a unitary body; wherein the first angle is a pitch angle of the gear teeth and the second angle is a pitch angle of the ring teeth, and wherein the first angle is perpendicular to the second angle; wherein each of the plurality of the gear teeth includes a toe disposed at a radially inwardly end thereof, wherein the toe is formed orthogonally to the first angle of the plurality of the gear teeth; and/or wherein the annular ring includes a frustoconical sidewall, an inner surface of the sidewall configured to cooperate with each of the toes of the plurality of the teeth to form a continuous surface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

FIG. 3B is a bottom perspective view of the hub of FIG. 3A;

FIG. 7 is a top perspective view of another example of a gear unit according to the present disclosure; and FIG. 8 is an exploded view showing an exemplary stern drive propulsion system using the gear units herein.

Corresponding reference numerals indicate corresponding parts throughout the drawings.

DETAILED DESCRIPTION

Figure 1A:
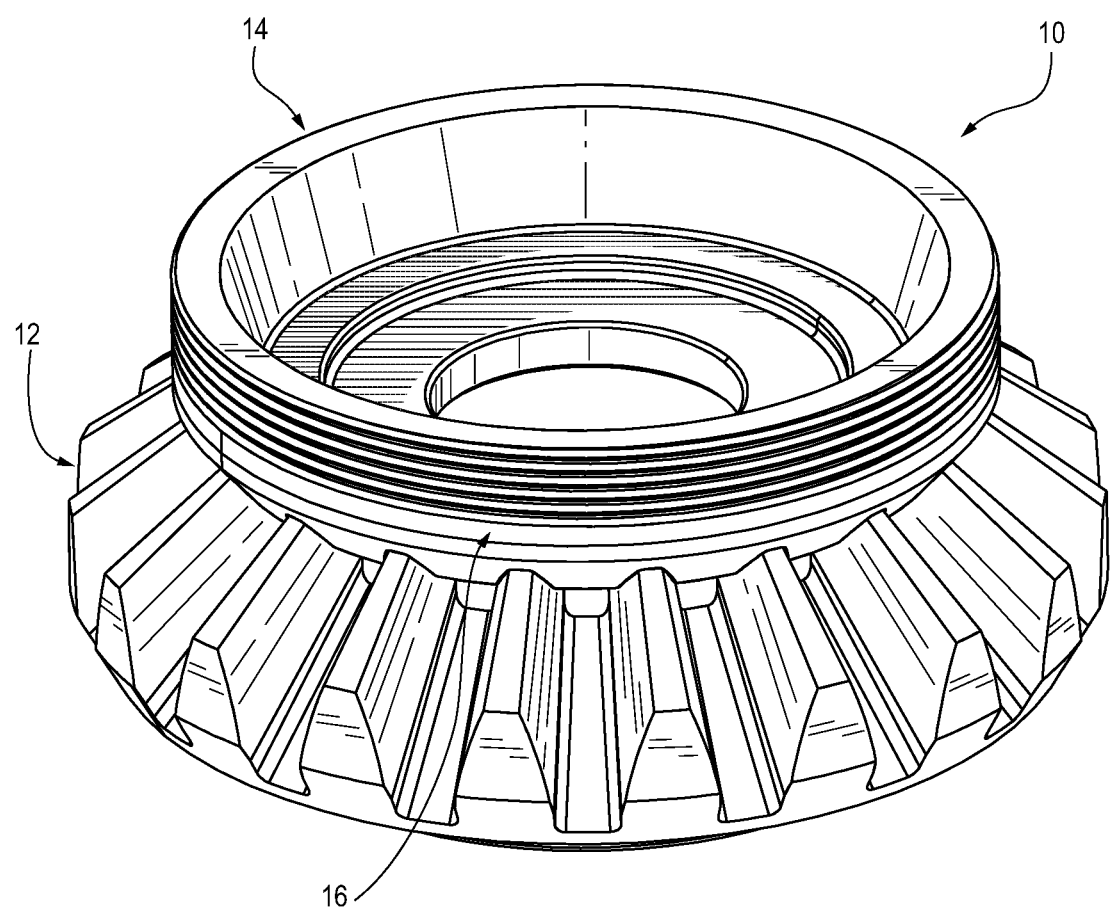
FIG. 1A is a top perspective view of a gear unit according to the present disclosure.

This disclosure relates to a gear assembly or gear unit including, in some aspects, a multiple component assembly that is configured to reduce the maximum stress on the gear teeth and, in particular, the toe of the gear teeth. In some aspects, the gear of the present disclosure is a bevel-type gear, which is designed to taper to a central point. Given this taper, the toe of the bevel gear tends to have a smaller cross-sectional area and exterior surface area. This configuration can, in some instances, lead to higher stress concentrations relative to other portions of the gear tooth during use. As mentioned in the background, when such gears are utilized in marine drive units or other high-stress gear assemblies, the stresses encountered in such applications are particularly problematic to such gears.

The gears of the present disclosure, on the other hand, are configured to support the toe of the gear tooth and, in some applications, can reduce the maximum bending stress on the gear teeth toe by up to and often over 2.5 times. Advantageously, the components of this new gear can be manufactured through conventional machining techniques (such as, for instance, through a Gleason bevel gear cutter or similar type machine) and assembled using common machining processing. In one aspect, a gear unit is provided that includes multiple components assembled together and in some approaches, is a three-piece system. By one approach, the gear units include a gear member with a plurality of gear teeth. This gear member may be a bevel type gear configured to mate with a conventional pinion, but may also be other types of gears such as straight cut bevel gears, spiral bevel gears, combination straight-cut and spiral bevel gear (such as a Zerol™-type bevel gear), and other common gearing units as discussed more herein. The gear units may also include a hub or central cone with at least a portion thereof received within an aperture of the gear member. The gear unit may also include a ring or support ring encircling the hub that defines a support surface to engage one or more of the plurality of gear teeth. The ring, hub, and gear may be separate components that are assembled into a gear unit as discussed more below.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers, sections, and or steps. These elements, components, regions, layers, sections, and/or steps should not be limited by these terms. These terms may be only used to distinguish one element, component, region, layer or section from another region, layer, sections, and/or steps. Terms such as "first," "second," and other numerical terms do not imply a sequence or order unless clearly indicated by the context. Thus, a first element, component, region, layer, section, or step discussed below could be termed a second element, component, region, layer, section, or step without departing from the teachings of the example configurations.

Turning to more of the specifics and with reference to FIGS. 1-7, one example of the present disclosure provides a gear unit 10 comprising a gear 12, a hub 14, and a support ring 16. In the implementation of the disclosure shown in FIGS. 1-6, the gear 12, the hub 14, and the support ring 16 are separate pieces and/or separable from each other. However, in alternate embodiments, any two or more of the gear 12, the hub 14, and the support ring 16 may be manufactured as a unitary body. For example, in the approach shown in FIG. 7, the entire gear unit 10 is formed unitarily. In other embodiments, the gear 12 and the ring 16 may be formed unitarily, while the hub 14 is separate, and alternatively, the hub 14 and the support ring 16 may be formed unitarily, while the gear 12 is formed separately.

In the example shown in FIGS. 1-7, the gear unit 10 is configured as a straight-cut bevel gear unit 10 for, in some approaches, cone-clutch gear assemblies, which are commonly employed in drive mechanisms within marine engines. However, those skilled in the art will appreciate that the concept of the instant disclosure may be applied to other types of gears, such as spur gears, spiral bevel gears, worm gears, hypoid gears, and helical gears, for example. Further, the benefits of this disclosure are not limited to marine applications, and may be realized in any application incorporating one or more of the aforementioned gear types, such as automotive applications, industrial applications, medical applications, and agricultural applications, for example.

Figure 2A:
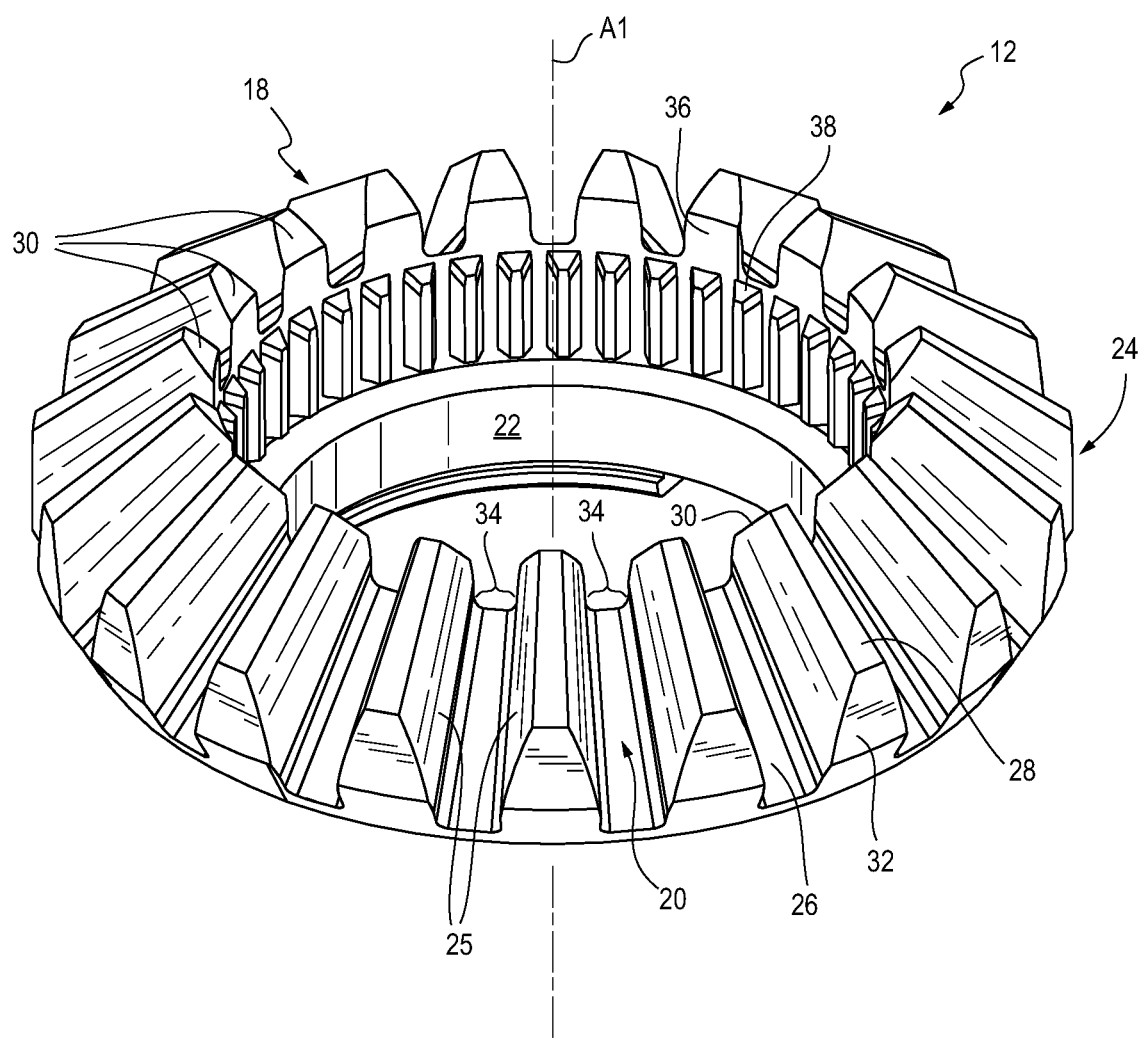
FIG. 2A is a top perspective view of a gear of the gear unit of FIG. 1.
Figure 2B:
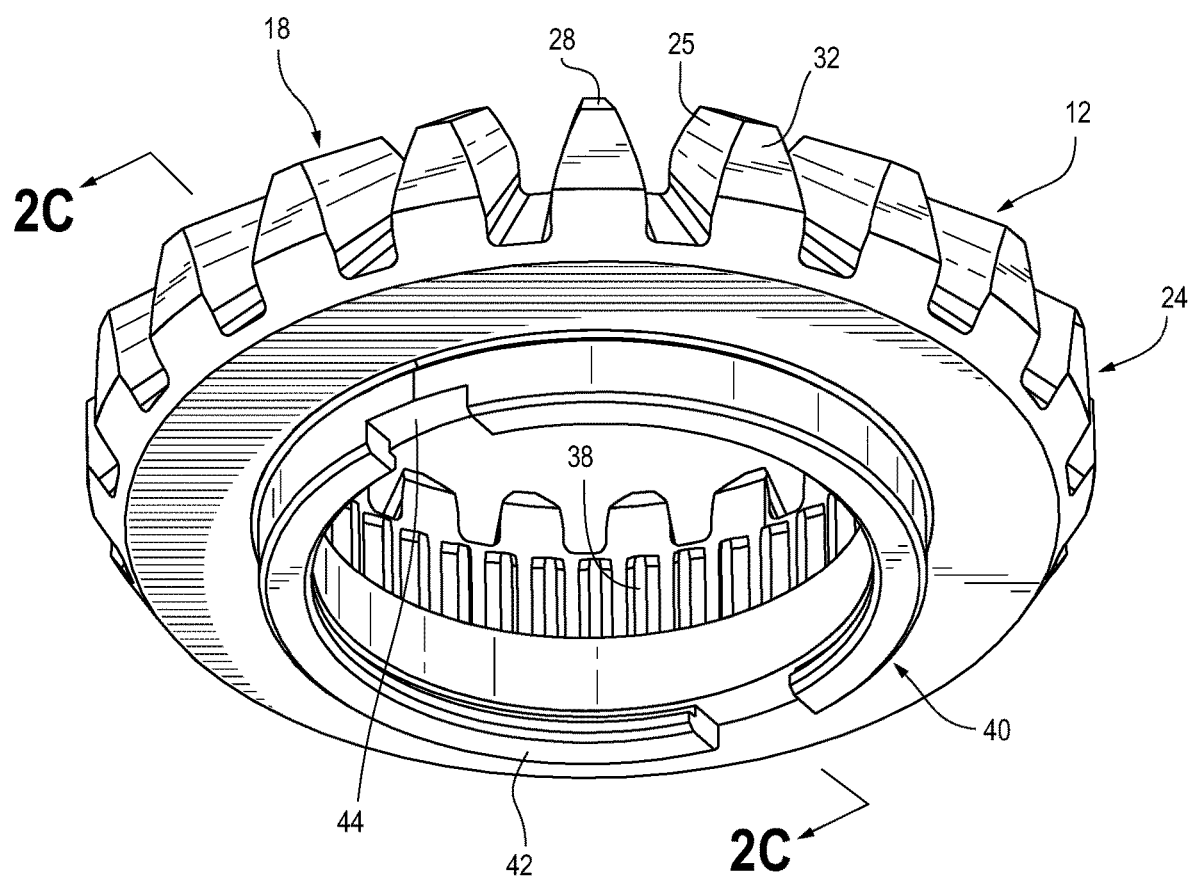
FIG. 2B is a bottom perspective view of the gear of FIG. 2A.

As shown in FIGS. 2A and 2B an example of the gear 12 is illustrated in more detail. In one approach, the gear 12 comprises an annular main body 18 defining a first axis A1 of the gear 12. The main body 18 includes a gear face 20 and defines an aperture 22 formed about the first axis A1 of the gear 12. In some approaches, the aperture 22 extends through the gear main body 18.

The gear face 20 of the main body 18 includes a plurality of gear teeth 24 extending therefrom. In the illustrated implementation, the gear 12 is a straight-cut, external-bevel gear, wherein the gear face 20 is generally frustoconical in shape and the gear teeth 24 extend outwardly from the gear face 20 at an oblique angle with respect to the first axis A1. In alternative implementations of the disclosure, the gear face 20 may be substantially planar, wherein the gear teeth 24 extend from the gear face 20 in an axial direction with respect to the first axis A1, or the gear face 20 may be cylindrical, wherein the gear teeth extend radially outwardly with respect to the first axis A1.

As is generally known in the art, each of the gear teeth 24 includes an opposing pair of sidewalls 25, which extend radially outwardly with respect to the first axis A1. Each of the gear teeth 24 further includes a root 26 formed at a base of each of the sidewalls 25, adjacent the gear face 20, and a crown 28 connecting distal portions of the sidewalls 25, opposite the root 26. Each of the gear teeth 24 further includes a toe 30 connecting radially inwardly ends of the sidewalls 25, and a heel 32 connecting radially outwardly ends of the sidewalls 25, opposite the toe 30. The gear teeth 24 further define a plurality of gear tooth spaces 34 formed therebetween, wherein each one of the gear tooth spaces 34 is formed intermediate the sidewalls 25 of adjacent ones of the gear teeth 24.

Figure 2C:
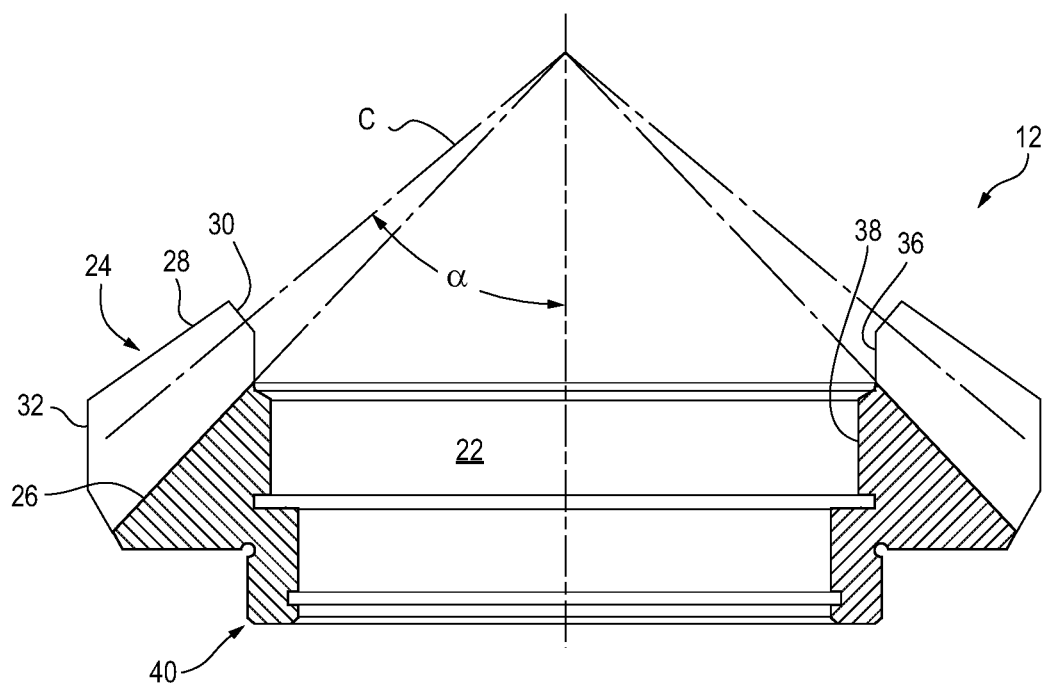
FIG. 2C is a cross-sectional view of the gear of FIG. 2A, taken along section line 2C-2C shown in FIG. 2B.

As shown in FIG. 2C, the particular dimensions selected for the gear face 20 and the gear teeth 24 define a theoretical pitch cone C of the gear. The pitch cone C represents an imaginary cone of the gear 12 that rolls without slipping on an opposing pitch surface of a meshing gear, as is understood in the art. An angle between the pitch cone C and the first axis A1 represents a pitch angle ($\alpha$) of the gear 12. Those skilled in the art of gear design will appreciate the various dimensional aspects of bevel gears. Therefore, these particular features are merely introduced here for reference, and will not be described in further detail.

Referring again to FIGS. 2A and 2B, the aperture 22 of the main body 18 is, in some approaches, a throughbore formed about the first axis A1, wherein the aperture 22 is defined by a substantially cylindrical inner sidewall 36 of the main body 18. The aperture 22 further includes an engaging feature 38 configured to prevent relative rotation of the gear 12 with respect to the hub 14 when the gear unit 10 is assembled. For example, as shown in FIGS. 2A and 2B, the engaging feature 38 of the gear 12 comprises a plurality of internal splines 38 extending radially inwardly from the inner sidewall 36, wherein the internal splines 38 are configured to engage the hub 14, as discussed hereinbelow. Other means or structure of preventing relative rotation between the gear 12 and the hub 14 will be appreciated by those skilled in the art. For example, the gear 12 and the hub 14 may be coupled using any one or more of a key and keyway, welding, independent fasteners, an interference fit, and/or a chemical bonding.

The gear 12 further includes an annular boss 40 circumscribing the aperture 22, and extending axially away from a perimeter of the inner sidewall 36 in an opposite direction from the gear face 20. The boss 40 is configured to cooperate with a radial bearing to facilitate rotation of the gear 12 when the gear unit 10 is incorporated into a respective drive 100, as shown in the exemplary approach of FIG. 8. As shown in FIG. 2B, the boss 40 comprises an annular lip 42 having a pair of keyways 44 formed in an end face thereof. However, those skilled in the art will appreciate that the boss 40 may be removed or replaced with other means or structure as needed for a particular application for cooperating with the bearing or other component, such as grooves or protuberances.

Figure 3A:
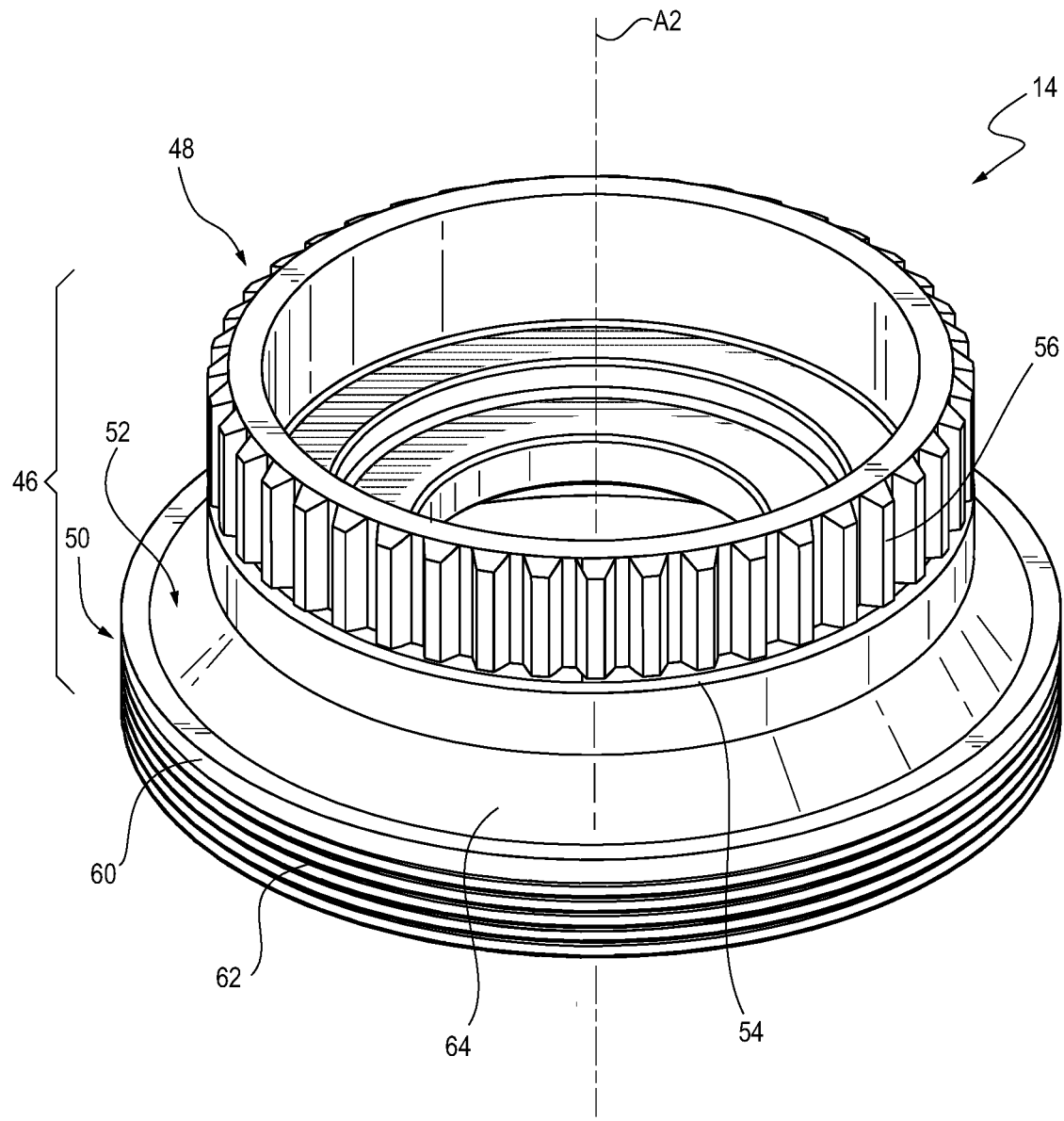
FIG. 3A is a top perspective view of a hub of the gear unit of FIG. 1.

Referring now to FIGS. 3A and 3B, the hub or central cone 14 comprises a cylindrical housing 46 having an annular rim 48 and a crown 50, both formed about a second axis A2 thereof. As shown, the rim 48 is formed at a first end of the hub 14, while the crown 50 is formed at an opposing second end of the hub 14. The hub 14 further includes a tapered neck 52 formed axially intermediate the rim 48 and the crown 50.

The rim 48 (or at least a portion thereof) of the hub 14 is configured to be received in the aperture 22 of the gear 12. In one embodiment, the rim 48 may be frictionally received within the aperture 22 via a press fit condition, thereby securing an axial position of the hub 14 with respect to the gear 12, and maintaining the retaining ring 16 therebetween, as shown in FIG. 1A. However, in alternate embodiments, the axial position of the hub 14 with respect to the gear 12 may be secured by other means.

Referring again to FIG. 3A, an engaging feature of the rim 48 is configured to cooperates with the engaging feature of the gear 12 to prevent the relative rotation of the gear 12 with respect to the hub 14 when the gear unit 10 is assembled. In one approach, an outer sidewall 54 of the rim 48 is cylindrical, and includes a plurality of external splines 56 extending radially outwardly therefrom. When the gear unit 10 is assembled, the external splines 56 of the hub 14 engage the internal splines 38 of the gear 12 to prevent relative rotation between the hub 14 and the gear 12. However, as discussed above, the engaging features of the gear 12 and the hub 14 may include other common means of preventing relative rotation between the gear 12 and the hub 14.

As provided above, the crown 50 of the hub 14 is cylindrical in shape and is coaxially aligned with the rim 48 along the second axis A2. As best shown in FIG. 3B, an inner sidewall 58 of the crown 50 of the hub 14 is inwardly tapered, wherein a diameter of the inner sidewall 58 progressively decreases as a distance from a distal end of the crown 50 increases. Accordingly, the inner sidewall 58 of the crown 50 is conical, and forms an internal conical-clutch surface. Thus, as illustrated in the exemplary approach of FIG. 8, the inner sidewall 58 of the hub 14 is configured to frictionally engage a corresponding external conical-clutch surface of a clutch 124 to transmit a torque from the gear unit 10 to the clutch 124 when the clutch 124 is engaged with the gear unit 10, thereby causing the clutch 124 to rotate. A cylindrical outer sidewall 60 of the crown 50 includes helical threading 62 formed therein, which is configured to engage corresponding helical threading of an optional wear bushing (not shown) of the drive 100, which may be coupled to the crown 50 to provide a supplemental friction surface for the clutch 124 to engage.

As introduced above, the neck 52 of the hub 14 is formed axially intermediate the rim 48 and the crown 50. In the illustrated example, an outer sidewall 64 of the neck 52 is frustoconical in shape, and tapers radially inwardly from the outer sidewall 60 of the crown 50 to the outer sidewall 54 of the rim 48. More particularly, a diameter and a taper angle of the outer sidewall 64 of the neck 52 may correspond to a diameter and taper angle of the toes 30 of the gear teeth 24, wherein the outer sidewall 64 of the neck 52 of the hub 14 abuts the toes 30 of the gear teeth 24 in a face-to-face relationship when the gear unit 10 is assembled. In alternative implementations, the neck 52 of the hub 14 may be substantially cylindrical, or may taper outwardly from the outer sidewall 60 of the crown 50 to the outer sidewall 54 of the rim 48.

Figure 1B:
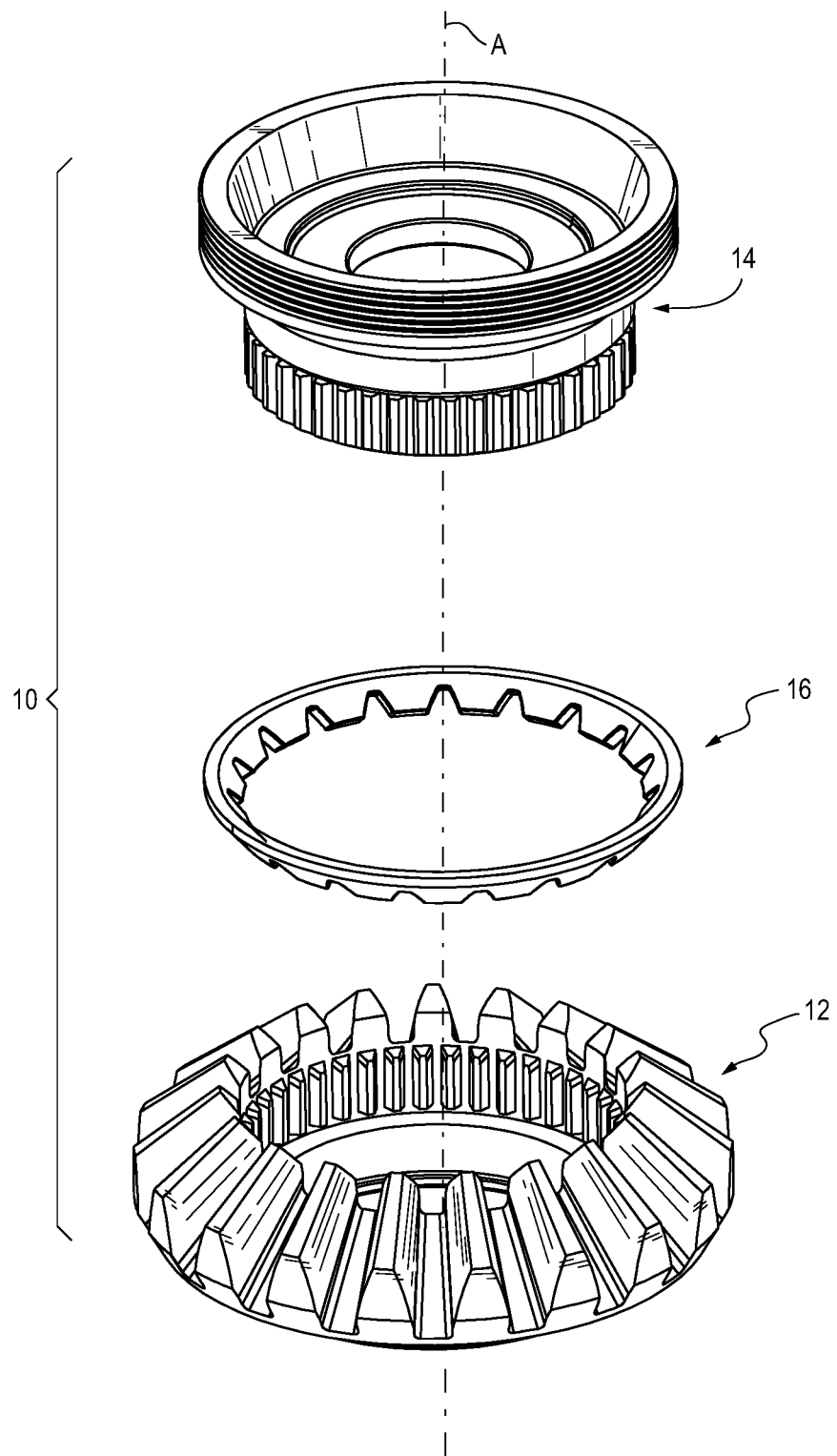
FIG. 1B is an exploded top perspective view of the gear unit of FIG. 1.
Figure 4A:
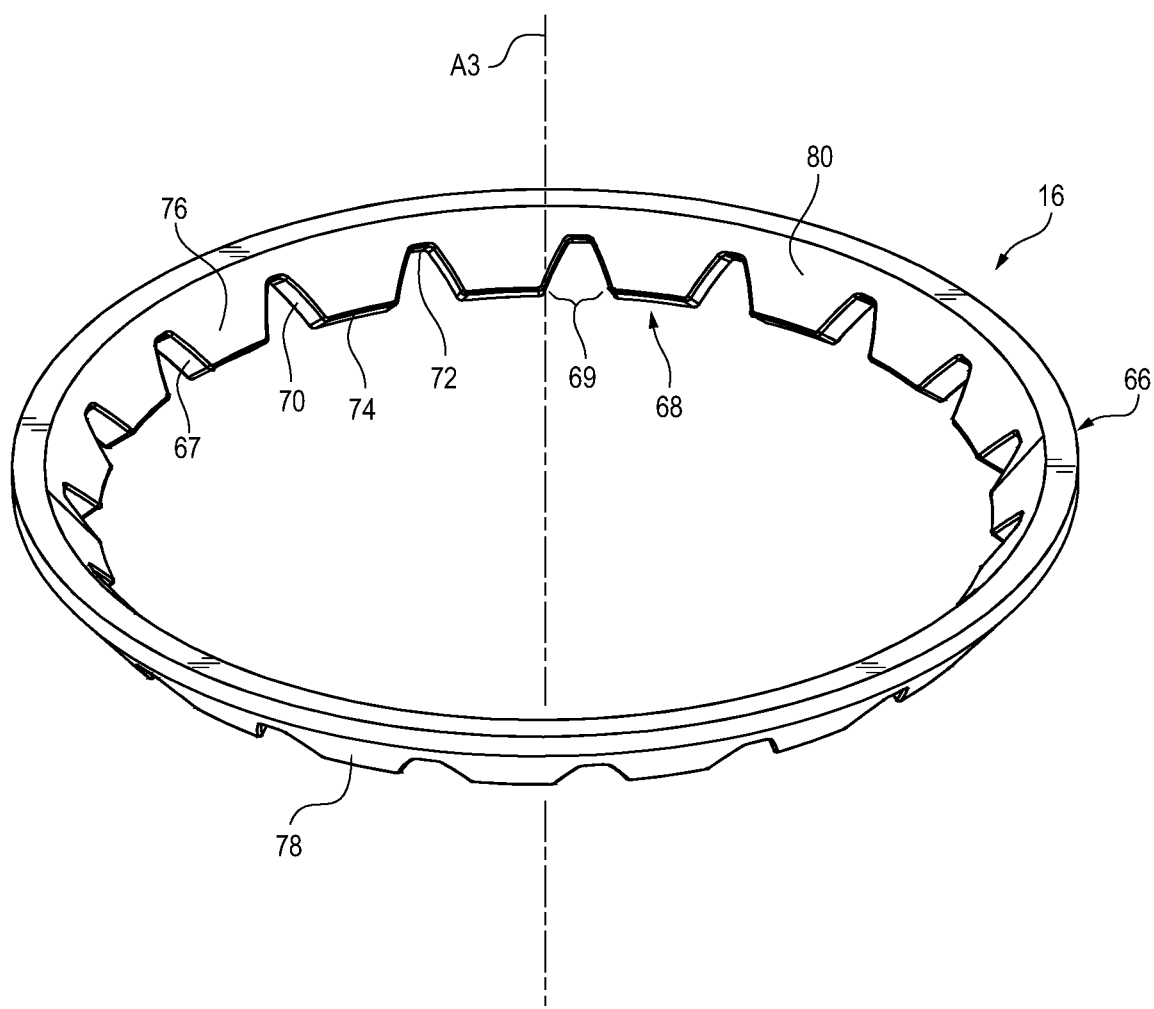
FIG. 4A is a top perspective view of a ring of the gear unit of FIG. 1.
Figure 4B:
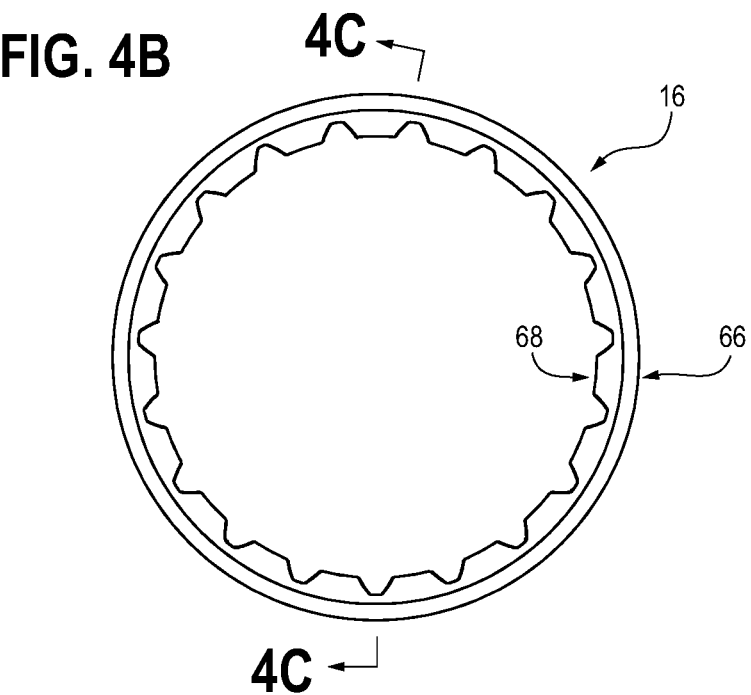
FIG. 4B is a top-plan view of the ring of FIG. 4A.
Figure 4C:
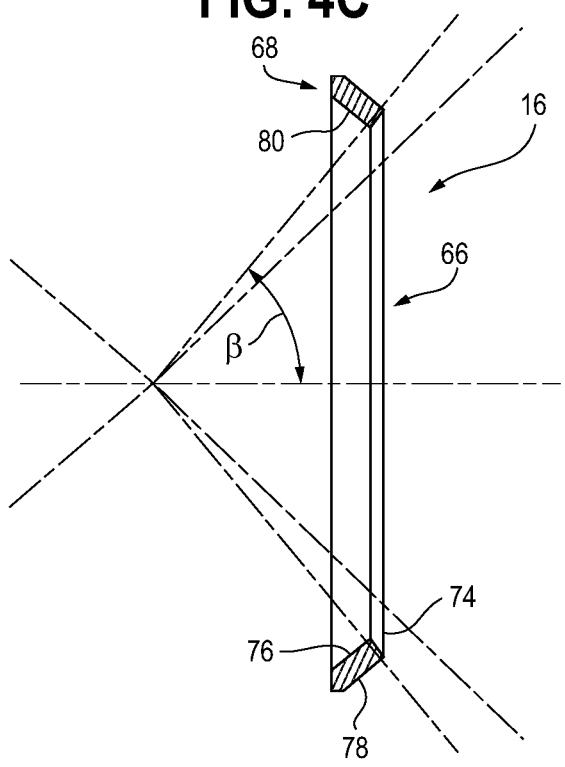
FIG. 4C is a cross-sectional view of the gear of FIG. 4B, taken along section line 4C-4C in FIG. 4B.

As shown in FIGS. 4A-4C, the exemplary ring 16 of the gear unit 10 is shown in more detail. In some approaches, the ring 16 comprises an annular member having a sidewall 66 formed about a third axis A3, and having a support surface 67 defined or formed at one end thereof. The support surface 67 is at least partially defined by a plurality of alternatingly formed cutouts forming ring teeth 68 and recesses 69, wherein adjacent ones of the recesses 69 are spaced from each other by adjacent ones of the ring teeth 68, and are configured to receive the gear teeth 24 therein as shown in FIGS. 1A and 1B.

For ease of discussion, the ring 16 is formed as an internal bevel gear, wherein the ring teeth 68 project inwardly at an oblique angle with respect to the third axis A3, and are configured to mesh with the gear teeth 24 of the gear 12 when the gear unit 10 is assembled. However, when assembled the ring 16 and gear 12 do not exhibit relative rotation to each other, but remain fixed to each other where the ring cutouts provide support to the gear teeth toes as further discussed herein. In some approaches, a pitch angle β of the ring teeth 68 is perpendicular to the pitch angle α of the gear teeth 24, wherein when the ring 16 is assembled to the gear 12, the ring teeth 68 mesh with the gear teeth 24 at a substantially perpendicular angle. Thus, the ring teeth 68 are substantially perpendicular to the sidewalls 25 and the crowns 28 of the gear teeth 24 in some exemplary approaches. Orienting the ring teeth 68 at a substantially perpendicular angle with respect to the gear teeth 24 is advantageous in some approaches, as stresses imparted on a first one of the gear teeth 24 can be distributed to an adjacent one of the gear teeth 24 through the intermediately disposed ring tooth 68, while minimizing bending stresses imposed on the ring 16. However, in alternate implementations, the ring teeth 68 may be formed at an oblique angle with respect to the gear teeth 24. Like each of the gear teeth 24, each of the ring teeth 68 is defined by an opposing pair of sidewalls 70 having a root 72 formed at a base of each of the sidewalls 70, and a crown 74 connecting distal portions of the sidewalls 70, opposite the root 72. Each of the ring teeth 68 further includes a toe 76 connecting radially inwardly ends of the sidewalls 70 and a heel 78 connecting radially outwardly ends of the sidewalls 70.

A size and profile of each of the ring teeth 68 is selected to correspond to a size and profile of the space 34 formed intermediate each of the gear teeth 24, wherein when the gear unit 10 is assembled, the ring teeth 68 are configured to bridge the space 34 to contact adjacent ones of the gear teeth 24. More specifically, the sidewalls 70 of the ring teeth 68 have a profile corresponding to the sidewalls 25 of the gear 12, wherein when the ring 16 is assembled to the gear 12 the sidewalls 70 of the ring teeth 68 are in face-to-face contact with the sidewalls 25 of the gear teeth 24. Accordingly torsional forces applied to a first one of the gear teeth 24 are distributed to adjacent ones of the gear teeth 24 via the intermediate ones of the ring teeth 68, thereby minimizing stresses within any one of the gear teeth 24.

Figure 5A:
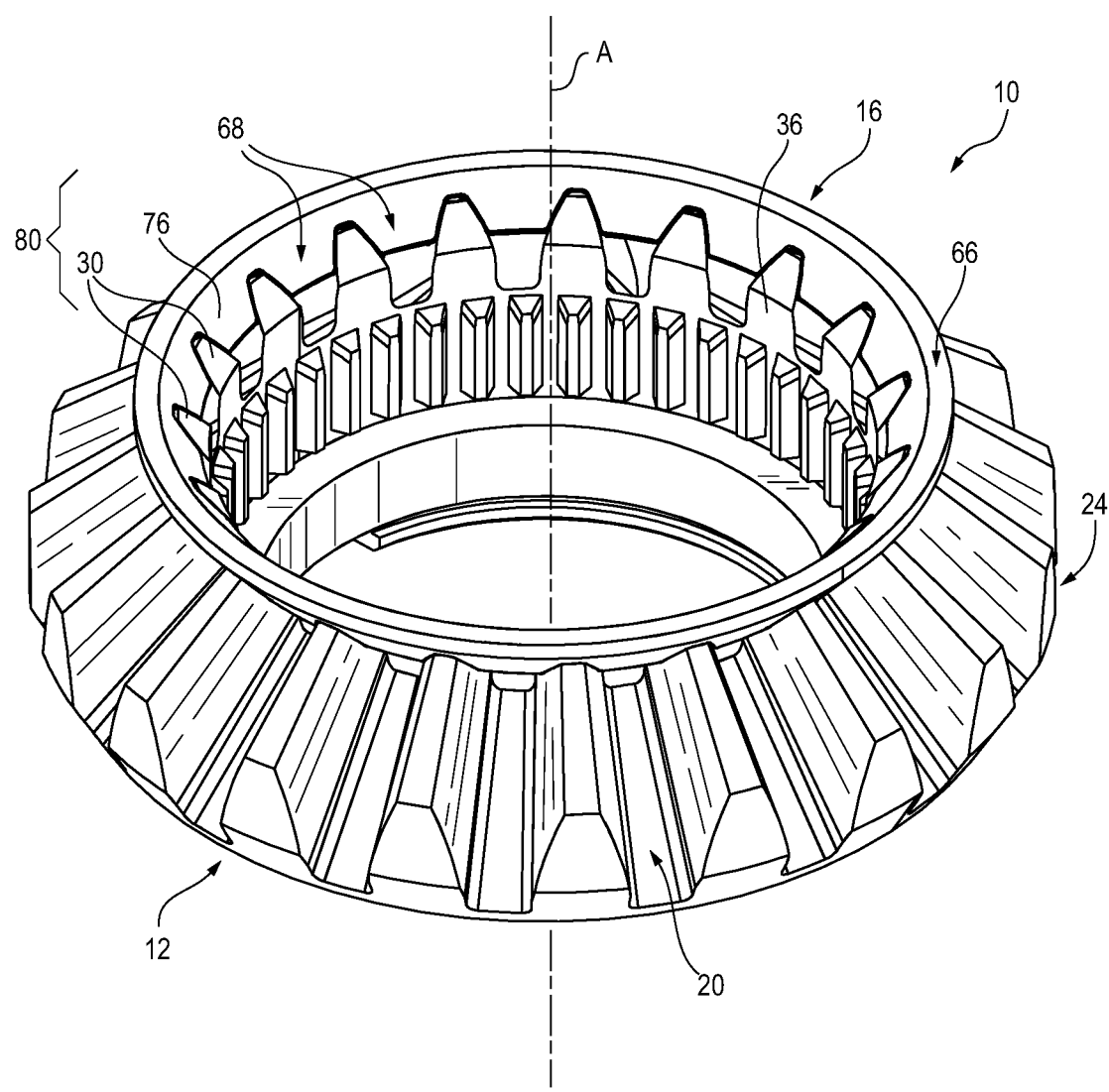
FIG. 5A is a top perspective view of a partially assembled gear unit of FIG. 1, wherein the support ring is assembled to the gear.
Figure 5B:
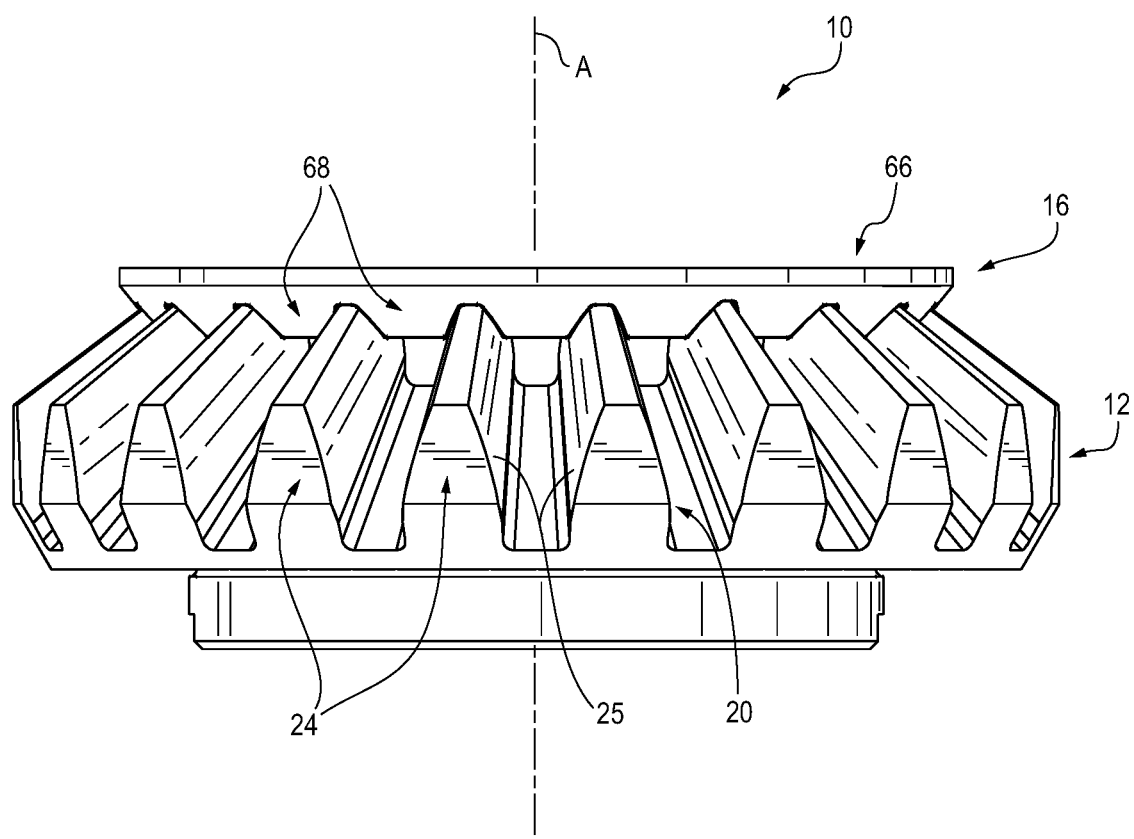
FIG. 5B is a front elevation view of the partially assembled gear unit of FIG. 5A.
Figure 6:
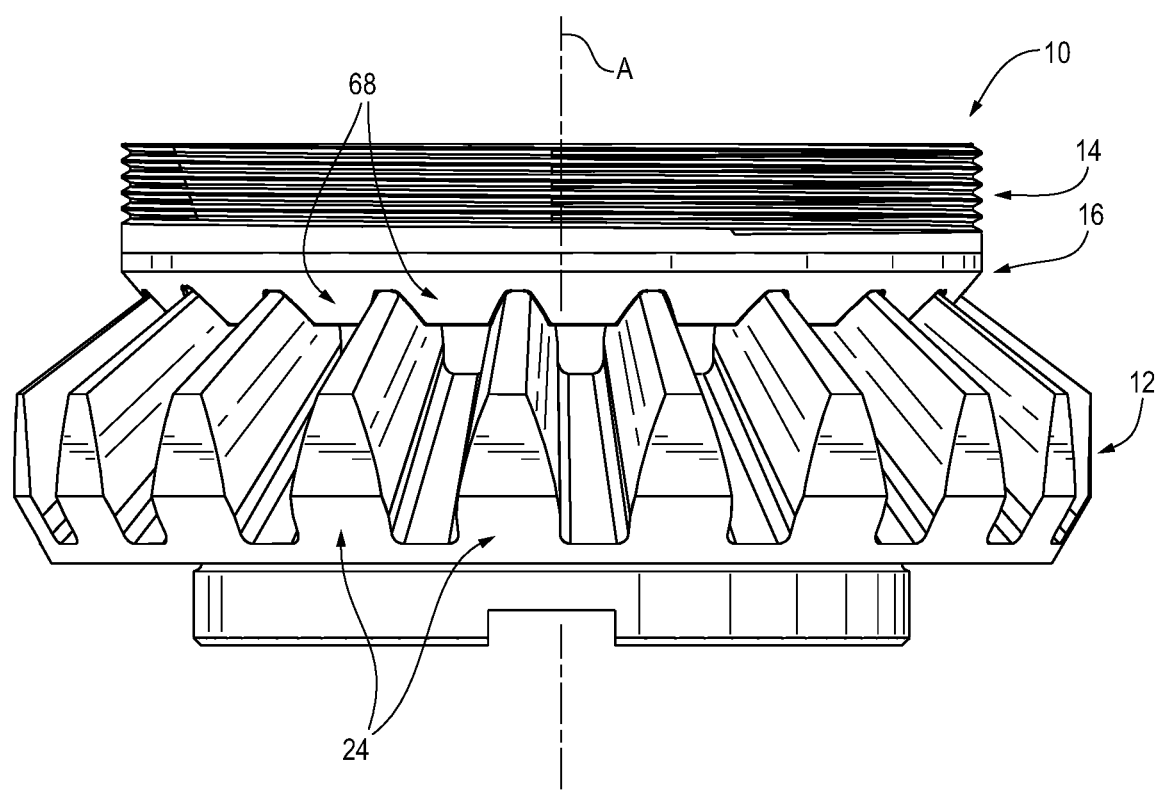
FIG. 6 is a front elevation view of the gear unit of FIG. 1.

In the illustrated example, the sidewall 66 of the ring 16 is frustoconical in shape, and an inner surface 80 of the sidewall 66 is configured to receive the neck 52 of the hub 14 when the gear unit 10 is assembled. In the illustrated example, a diameter and taper angle of the inner surface 80 of the sidewall 66 of the ring 16 correspond to a diameter and a taper angle of the toes 30 of the gear teeth 24, wherein the inner surface 80 of the sidewall tapers inwardly along a direction of the third axis A3. Furthermore, the toes 76 of the ring teeth 68 are integrally formed with the inner surface 80 of the sidewall 66. Accordingly, as shown in FIG. 5A (illustrating just the gear 12 and ring 16 in an assembled form), when the ring 16 is assembled to the gear 12, the toes 30 of the gear teeth 24 and the toes 76 of the ring teeth 68 cooperate to form respective first and second portions of a substantially continuous, inner conical surface 80, upon which the outer sidewall 64 of the hub neck 52 is configured to be received in a face-to-face relationship.

Although a thickness of the sidewall 66 is shown as substantially uniform, the thickness may increase or decrease to provide a tapered thickness as needed for a particular application.

Referring to FIG. 7, another example of a gear unit 10' is shown. Similar to the example of the gear unit 10 shown in FIGS. 1-6, the gear unit 10' includes a gear 12', a hub 14', and a support ring 16'. However, in the example of FIG. 7, the gear unit 10' is formed as a unitary assembly, wherein each of the gear 12', the hub 14', and an integrally formed support ring 16' are formed of a single piece of material. The gear unit 10' may desirable when various sizes and shapes of gear units 10' are required, thereby lending to the use of a multi-axis machining center to incorporate one-off dimensions, as opposed to using traditional gear manufacturing tools.

Referring to FIG. 8, an example of a drive 100 incorporating a gear unit 10 or 10' according to the instant disclosure is shown. The drive 100 includes a lower or main housing 110 configured to receive the cone-clutch assembly 120 therein. The cone clutch assembly includes a pair of the gear units 10 or 10' rotatably received on opposing ends of a drive shaft 122, wherein the crowns 50 of the gear units 10 or 10' face each other. A clutch or cone clutch 124 is rotatably fixed to the drive shaft 122, intermediate the crowns 50 of the gear units 10 or 10'. The drive 100 further includes a variety of peripheral drive components (not numbered), which are configured to facilitate rotation and sealing of the drive 100.

In operation, an output from the engine includes a pinion gear (not shown) disposed through the front opening 130 of the housing 110, and engaging each of the gear units 10 or 10'. The pinion gear is disposed intermediate the gear units 10 or 10', wherein rotation of the pinion gear in a first direction causes a first one of the gear units 10 or 10' to rotate in a first direction, while the second one of the gear units 10 or 10' is caused to rotate in an opposite direction. To facilitate forward rotation of the propeller (not shown), which is connected to the drive shaft 122, the cone clutch 124 is biased towards a first one of the gear units 10 or 10', wherein the cone clutch 124 engages the inner sidewall 58 of the crown 50 to cause the cone clutch 124 to rotate in the first direction. Accordingly, the drive shaft 122 and the propeller are cause to rotate in the first direction. Likewise, to facility rotation of the propeller in a second direction, the cone clutch 124 is biased towards the second one of the gear units 10 or 10', wherein when the cone clutch 124 engages the inner sidewall 58 of the crown 50 of the second one of the gear units 10 or 10', the cone clutch 124 is caused to rotate in the second direction. Accordingly, the drive shaft 122 and the propeller will also be caused to rotate in the second direction.

The use of a supporting ring 16 or 16' according to the instant disclosure has been discovered to advantageously minimize localized stresses imparted on loaded gear teeth by distributing the stress to unloaded teeth. For example, when a load is applied to a first face of a first one of the gear teeth, the gear tooth deforms slightly and the ring tooth abutting the second sidewall of the tooth is compressed. The compressive force applied to the ring tooth is distributed to a subsequent one of the gear teeth. Simultaneously, a portion of the retaining ring 16 or 16' preceding the ring tooth goes into tension, and distributes a portion of the load to the preceding tooth. The amount of load distributed, and the number of gear teeth the load is distributed to, is dependent on the magnitude of the load, and the dimensional configuration of the gear and support ring. Thus, the supporting ring 16 or 16' distributes the force, during use, on loaded gear teeth to unloaded gear teeth.

In one analysis, adding the support ring to the gear unit reduced the maximum stress on a gear tooth during use and upon the gear experiencing about 1000 ft-lbs of loading from about 4 GPa to about 1.5 GPa. Accordingly, incorporation of the support ring according to the instant disclosure may, in some approaches, reduce bending stress by almost 267%.

In addition to the aforementioned performance benefits provided by the instant disclosure, the gear unit according to the instant disclosure can advantageously be manufactured using conventional gear machining techniques, which offer improved precision, surface finish, and material quality over forged gears of the prior art.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A gear unit comprising:

A bevel gear including an annular body having an aperture formed therethrough, a plurality of gear teeth extending radially outwardly from a face of the annular body and each including a first sidewall and a second sidewall disposed on an opposite side thereof, and a plurality of gear tooth spaces each defined by opposing first and second sidewalls of adjacent ones of the gear teeth;

a hub formed separately from the gear, at least a portion of the hub received within the aperture, wherein the hub is rotationally fixed with respect to the gear;

a ring encircling the hub and including a plurality of ring teeth each having a first sidewall and a second sidewall disposed on an opposite side thereof, whereby each of the plurality of the ring teeth is received within a respective one of the gear tooth spaces and the first sidewall of each of the ring teeth contacts the first sidewall of one of the gear teeth to provide support thereof, wherein each of the gear, the hub, and the ring are separable from each other; and wherein each of the gear teeth includes a crown formed at a distal end thereof, and wherein the ring extends over a portion of the crown adjacent to a toe of each of the gear teeth.

2. The gear unit of claim 1, wherein the second sidewall of each of the ring teeth contacts the second sidewall of one of the gear teeth to provide support thereof.

3. The gear unit of claim 2, wherein the ring includes a tapered inner surface.

4. The gear unit of claim 3, wherein the hub includes a tapered neck configured to be received on the inner surface of the ring.

5. The gear unit of claim 3, wherein the inner surface of the ring cooperates with a toe of each one of the gear teeth to form a continuous inner surface.

6. The gear unit of claim 1, wherein the annular body of the gear includes internal splines disposed within the aperture and the hub includes corresponding external mating splines.

7. The gear unit of claim 1, wherein each of the plurality of the gear teeth includes a toe formed at a radially inwardly end thereof, and the ring teeth of the ring are received within the gear tooth spaces adjacent to the toe of each of the gear teeth to provide support of each of the plurality of the gear teeth.

8. The gear unit of claim 1, wherein the bevel gear is one of a straight-cut bevel gear, a spiral bevel gear, or a combination straight-cut and spiral gear.

9. A gear unit comprising:

a bevel gear including a plurality of gear teeth extending radially outwardly from a first end of the gear at a first angle, a plurality of gear tooth spaces being disposed between and defined by adjacent ones of the gear teeth;

a ring including a plurality of ring teeth extending from an end of the ring at a second angle transverse to the first angle, wherein each of the plurality of the ring teeth is received within a corresponding one of the gear tooth spaces and contacts one of the gear teeth;

wherein the ring is rotationally secured with respect to the gear; and wherein each of the gear teeth includes a crown formed at a distal end thereof, and wherein the ring extends over a portion of the crown adjacent to a toe of each of the gear teeth.

10. The gear unit of claim 9, further comprising a hub having a cylindrical housing including a rim disposed at a first end of the housing and received within the gear, a crown disposed at a second end of the housing and extending axially away from the gear and the ring, and a neck disposed between the rim and the crown and at least partially received by each of the gear and the ring.

11. The gear unit of claim 10, wherein gear includes an aperture formed therethrough, the aperture including a plurality of internal splines to cooperate with the first end of the hub to prevent relative rotation between the gear and the hub.

12. The gear unit of claim 10, wherein the crown of the hub includes a conical inner sidewall.

13. The gear unit of claim 10, wherein the neck of the hub includes a frustoconical outer sidewall, the outer sidewall of the neck configured to be received within each of the gear and the ring.

14. The gear unit of claim 10, wherein the gear, the ring, and the hub are separately formed from each other.

15. The gear unit of claim 10, wherein at least two of the gear, the ring, and the hub are formed as a unitary body.

16. The gear unit of claim 9, wherein the first angle is a pitch angle of the gear teeth and the second angle is a pitch angle of the ring teeth, and wherein the first angle is perpendicular to the second angle.

17. The gear unit of claim 9, wherein each of the plurality of the gear teeth includes a toe disposed at a radially inwardly end thereof, wherein the toe is formed orthogonally to the first angle of the plurality of the gear teeth.

18. The gear unit of claim 17, wherein the ring includes a frustoconical sidewall, an inner surface of the sidewall configured to cooperate with the toe of each of the plurality of the teeth to form a continuous surface.

* * * * *